June 26, 1956  J. URTEAGA  2,751,933
MULTIPLE SERVO SELECTOR
Filed June 24, 1952
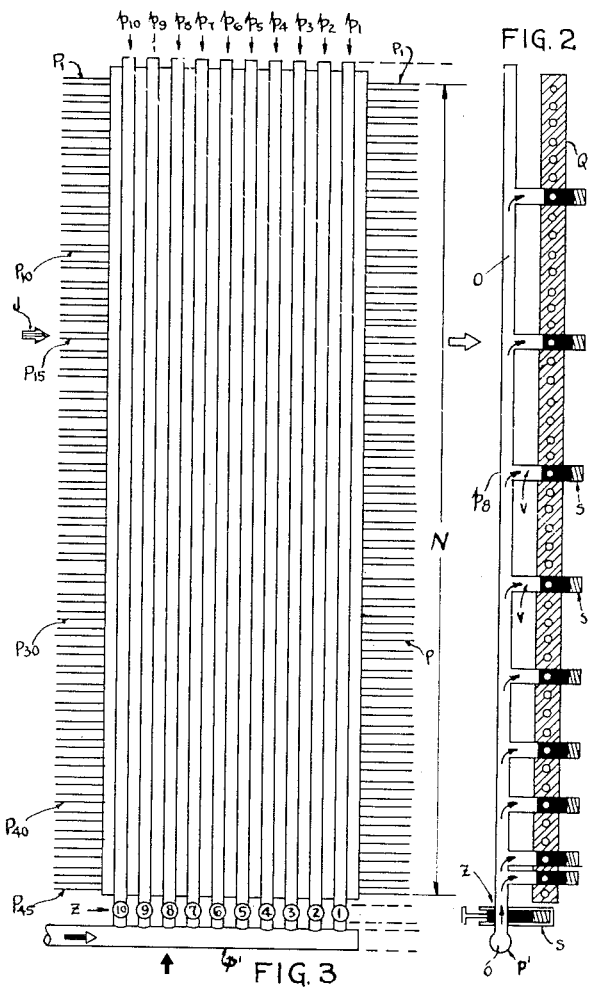
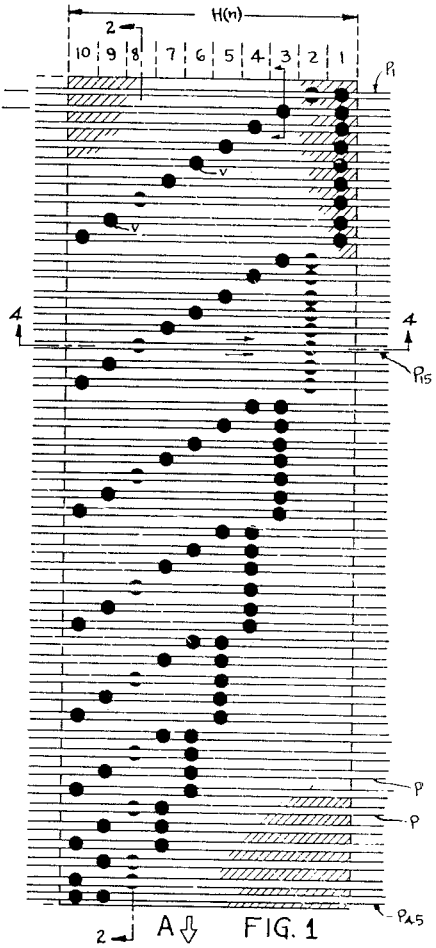
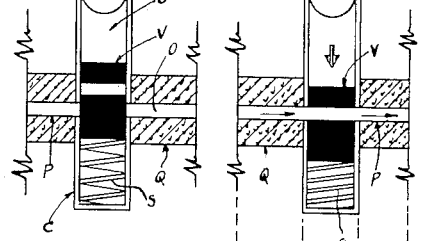
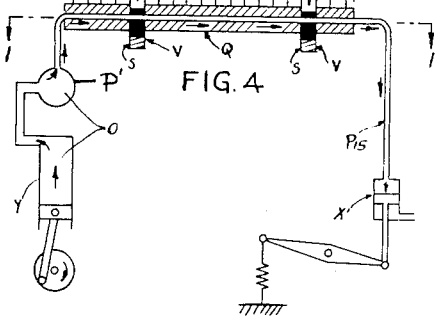
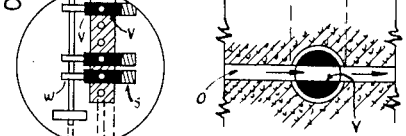
INVENTOR.
JAIME URTEAGA
BY U̲n̲i̲t̲e̲d̲ S̲t̲a̲t̲e̲s̲ P̲a̲t̲e̲n̲t̲ O̲f̲f̲i̲c̲e̲

2,751,933
Patented June 26, 1956

2,751,933

MULTIPLE SERVO SELECTOR

Jaime Urteaga, Santiago, Chile

Application June 24, 1952, Serial No. 295,271

2 Claims. (Cl. 137—622)

This invention is a hydraulic or air pressure (i. e., fluid pressure) application of the multiple selection system as described in my previous U. S. patent application Serial No. 136,259 (now Patent No. 2,624,787) entitled "Photoelectric Selector of Electric Circuits."

The present invention refers to a multiple servo selector and is composed of a plurality of selection pipe circuits each one of which works as a servo unit directly over machines, commands, controls, etc. Two or more valves are inserted in each one of the selection pipe circuits to control fluid flow therein in different positions relative to one another. There is also a plurality of preselection command pipes activated by a combination of two or more command signals such as digit, press-button working over the corresponding pre-selection command valves operated by external power.

The selection pipe circuit system and the pre-selection command pipe system work in conjunction with hydraulic or air pressure power to operate as servomotor units. This source power is not described in detail since it is unnecessary for the definition of the invention.

This invention relates only to the multiple selector valve panel or chassis in which are placed the following: the selection pipe circuits, the valves intercalated in the said selection pipes and the pre-selection command pipes.

The selection system is the same as described in the said U. S. application Serial No. 136,269 (now Patent No. 2,624,787) but in the present invention the circuits to be selected are pipes for hydraulic or air pressure systems.

To each of the pipe circuits corresponds a device or apparatus to be put into action directly by means of hydraulic or air pressure power as a servo unit. This combination of a multiple selector and servo unit is one of the advantages of the present invention over existing selectors and servo units. Another important advantage of this selector is that the hydraulic or air pressure flow power of any one of the selected circuits may be regulated.

My invention can be applied to factories, ships, tanks, remote control devices, aircraft, submarines, robots, etc., and, in general, whenever it is necessary to move or put into action a great number of machines, apparatus in general, ailerons, rudders, controls, etc., with a simple combination of two, three, four or more conventional command signals.

Each one of the pipe circuits may be interrupted by two, three or more valves. These valves are analogous to the light sensitive elements in my aforesaid Patent No. 2,624,787. The valves are placed with the corresponding selection pipe circuits in a panel forming longitudinal and transverse rows.

These said valves have different relative positions with respect to one another for each pipe circuit, and this condition provides the different combinations for the selection circuits and characterizes the multiple servo unit selector. In consequence, the selection of a circuit is obtained by putting into action a pre-selected combination of two, three, four or more preselection command pipes or bars, according to the number of valves in each selection pipe circuit. The valves are intercalated in the selection pipe circuits forming chain pipe circuits of the hydraulic or air pressure type. Each one of the selection pipes is intercalated by a plurality of valves forming selector chain pipe circuits. These numbers of valves may be two, three, four or more. The number of combinations or different pipe circuits which may be selected depends on the number of command pipes and the number of valves intercalated in each of the selection pipe circuits.

Description of drawings

Figure 1 represents a sectional view of the panel selector, taken on line 1—1 of Fig. 4, in which the hydraulic or air pressure valves are represented by dots. In the example described hereinafter, the selector has 45 different selection pipe circuits and 10 preselection command pipes. Each one of the selection pipe circuits is intercalated by a minimum of 2 valves.

Figure 2 represents a longitudinal sectional view taken on line 2—2 of Fig. 1.

Figure 3 represents a front view of the selector looking in the direction of arrow A of Fig. 4.

Figure 4 represents a transverse sectional view of the selector taken on line 4—4 of Fig. 1.

Figure 5 represents an enlarged cross-section of a valve in action (opened) (from Fig. 4).

Figure 6 represents an enlarged cross-section of valve in normal position, interrupting a selection pipe circuit.

Figure 7 is a transverse sectional view of the valve of Fig. 5.

Figure 8 is a partial section, representing a portion of Fig. 2, showing the valves actuated by a rotating, preselection (command) shaft and Figure 9 is a vertical sectional view through Fig. 8.

The invention will be more fully understood by reference to the drawing in conjunction with the following description:

$P_1$—$P_2$—$P_3$—$P_4$ . . . $P_{45}$ represent the hydraulic or air pressure selection pipe circuits each of which is interrupted by two or more valves. Each one of the said circuits has a different combination from every other circuit. The pipe circuits are interrupted by two, three or more valves forming preselection chain pipe circuits.

$p_1$—$p_2$—$p_3$ . . . $p_{10}$ represent the preselection command pipes of the hydraulic or air pressure system. These preselection command pipes may be operated by valves which may be worked by digit or any other command means. Each command pipe is located adjacent to a longitudinal row of valves. For each of these preselection command pipes there is a conventional signal.

The letters V represent the valves intercalated in the selection pipe circuits, which may be either of hydraulic or air pressure type.

The letter Q represents the support or chassis in which are placed the selecting pipes P and the valves V.

S represents the spring or other means that presses over each of the valves V and Z and maintains the same normally in the closed position (see Fig. 6).

O represents the vehicle which may be oil, air pressure or any other suitable vehicle or medium.

Z represents the preselection command valves of hydraulic or air pressure type. These valves are operated by a pre-selected combination of two, three or more conventional signals, by hand or by means of any other external power.

$p'$ represents the main pipe of the preselection command pipe power system.

C represents a cover for each of the springs S.

X represents the piston that works directly over the machines or apparatus functioning as servo units.

P' represents the matrix or main pipe of hydraulic or air pressure power to which the system of all selection pipes P may be connected (45 selection pipes in the example described).

Y represents the mechanical means for hydraulic or air pressure power for the selection pipe circuits P.

N represents the number or plurality of selection pipe circuits P.

H($n$) represents the number or plurality of preselection command pipes $p$ or bars B (Fig. 9).

B represents bars which may be used instead of preselection command pipes $p$. In the example illustrated in Figs. 8 and 9, the bar has rotatory motion and the bars can also operate by translational motion over the valves in the corresponding row of such valves.

W represents eccentric wheels attached to the bars B and which act directly over the corresponding valves by rotatory motion.

The principal elements comprising this servo selection are the following:

(I) A group of selection pipe circuits P is placed in series alongside one another and each one of them is intercalated by two or more valves of the hydraulic or air pressure type. This group of selection pipe circuits P may be arranged in a panel Q or in any other suitable support or chassis. In the example described, there are 45 selection pipe circuits P, as already indicated.

(II) There is also a group of valves V of the hydraulic or air pressure type. These valves intercalate or interrupt the selection pipe circuits P in different position. In the example described each selection pipe circuit P is interrupted by two valves V and, in consequence, the total number of valves in the example is 90. The valves are placed so that they form rows. When the valves are in their normal position (Fig. 6), the circuits are closed by means of springs S.

When the command pipes stop functioning, the hydraulic pressure over the corresponding valves ceases and the said valves are pressed by the spring to the "off" or "closed" position (Fig. 6).

(III) There is a group of preselection command pipes or bars B. These may be either:

(a) A group of preselection command pipes placed perpendicularly and along the group of the selection pipe conduits P. To each of said preselection command pipes there corresponds a conventional signal; or (b) A group of preselection command bars B placed perpendicularly and along the group of selection pipe circuits P. These bars may be of two types, such as bars with a translational motion or bars with a rotatory motion. In the example described (Figs. 8 and 9), the latter type are shown in which to each valve there corresponds an eccentric wheel W placed in the command bar.

(IV) A source of hydraulic or air pressure power which is to be provided to operate the selection pipe circuits P.

(V) A source of hydraulic or air pressure power or any other mechanical means to transmit power to the preselection command system which may be either hydraulic, air pressure pipes $p$ or bars B.

The preselection command pipes $p$ or bars B are placed perpendicularly to the selection pipe circuits P, and to each row of valves V there corresponds one of the said preselection command pipes $p$ or bars B. To each of these preselection elements there corresponds a conventional signal.

When hydraulic or air pressure command pipes are used, these pipes $p$ are activated by means of the corresponding preselection valve Z. This valve may be operated directly by hand or by any other external or mechanical means. The preselection command valves Z may be actuated by wireless command signals and to each one of the command pipes may correspond a crystal channel with different frequency characteristics.

In the example described in the drawing, when one of the preselection command pipes $p$ is operated 9 valves V are put into action and up to this moment all the selection pipe cricuits P still remain closed. But if a second preselection command pipe $p$ is activated only 1 of the 45 selecting pipe circuits P is put into action and another 9 valves V are also put into action. In the example illustrated in the drawings (Fig. 4), the selection pipe circuit P$_{15}$ is put into action by operating the preselection command pipes $p_2$ and $p_8$. All the rest of the selection pipe circuits P remain closed.

If the selector has three valves V interrupting each one of the selection pipe circuits P the selection is tripled and it is necessary to activate three preselection command pipes $p$ or bars B to select the desired circuits. If the selector has 4 valves V interrupting each one of the selecting pipe circuits P it is necessary to put into action four preselection command pipes $p$ or bars B to select the desired circuit. In consequence, in this last case, if 3 command pipes $p$ or bars B are put into action all the selection circuits P of the group remain closed.

It is necessary to put into action the same number of preselection command pipe $p$ as the number of valves V interrupting each one of the selection pipe circuits P.

The number of different combinations of hydraulic or air pressure circuits P can be obtained with this multiple selector are determined by the formulas described in my U. S. patent application Serial No. 136,259 (now Patent No. 2,624,787).

They are as follows:

(a) If the selector has two valves V interrupting each one of the selection pipe circuits P and there are a variable number of preselection command pipes $p$, the formula is:

$$N(2) = \frac{(n-1) \times n}{2}$$

This formula applied to the example of the drawings is:

$$N(2) = \frac{(10-1) \times 10}{2} = 45 \text{ combinations}$$

(b) If the selector has three valves V interrupting or intercalated in each one of the selection pipe circuits P and there are a variable number of preselection command pipes $p$ or bars B, the formula is:

$$N(3) = (n-2)^2 + (n-2)^2 - (n-2)$$

This formula applied to a selector with ten preselection command pipes is:

$$N(3) = (10-2)^2 + (10-2)^2 - (10-2) = 120 \text{ combinations}$$

In these formulas N represents the total number of different combinations of the selection pipe circuits P of the selector and $n$ represents the number of preselection command pipes $p$ or bars B.

In the formulas the numbers (2) and (3) in connection with N represent the number of valves V intercalated in each of the selection pipe circuits P and $n$ represents the number of preselection command pipes $p$. The vehicle O may be oil or any other appropriate medium when using the hydraulic system. When using the air pressure system the vehicle O may be air or any other similar gas.

This patent application is closely related to my patent application Serial No. 136,259 (now Patent No. 2,624,787) as they are both based on the same selection system. The electric circuits, the light sensitive elements and light sources in my application 136,259 (now Patent No. 2,624,787) are equivalent to the selection pipe circuits P, valves V and preselection command pipes $p$, respectively, in my said patent application. The servo selector already described in the specification also comprises a piston for each of the selection pipe circuits and all other necessary accessories which are used in connection with servo units such as feed pumps or compressors for the hydraulic or air pressure system such as is indicated in Fig. 4.

Figures 8 and 9 represent an alternative application in which shafts are used instead of command pipes.

I claim:

1. A servo-selector system comprising a plurality of fluid-pressure selection pipe circuits disposed in a panel and placed one beside another, a plurality of valves inserted in each selection pipe to control fluid flow therein, all said valves being arranged in longitudinal and transverse rows with at least one of the valves in each succeeding selection pipe circuit having a progressively advanced transverse position relative to one of the valves in preceding circuits, a plurality of fluid-pressure command pipes each corresponding to one of the said longitudinal rows of valves, a plurality of command valves corresponding to each of the respective command pipes, all the valves of the selection pipe circuits forming groups which in number and disposition are related to the number of valves intercalated in each selection pipe circuit and to the number of command pipes, the selection pipes forming separate pipe circuits, two valves inserted in each pipe circuit and each pipe circuit being activated by putting into action a pre-selected combination of two command pipes, all the valves in the selection pipe circuits forming a multiplicity of combinations wherein the first selection pipe of the first group of valves combines the first with the second command pipe, the second selection pipe of the same group combines the first with the third command pipe, and so on successively until the last selection pipe of the first group of valves combines the first with the last command pipe of the selector, the second group of valves forming a multiplicity of combinations wherein the first selection pipe of this group combines the second with the third command pipe, the second selection pipe of this group combines the second with the fourth command pipe, the third selection pipe of this group combines the second with the fifth command pipe, and so on successively until the last selection pipe of the second group combines the second with the last command pipe of the selector; for the third group of valves, the first selection pipe of this group combines the third with the fourth command pipe, the second selection pipe of this group combines the third with the fifth command pipe, and so on successively until the last selection pipe of the third group combines the third with the last command pipe of the selector, the said combination system being applied successively for all the remaining groups of valves until the last group, which consists of only one selection pipe, combines the two last command pipes of the selector.

2. A servo-selector system comprising a plurality of fluid-pressure selection pipe circuits disposed in a panel and placed one beside another, a plurality of valves inserted in each selection pipe to control fluid flow therein, all said valves being arranged in longitudinal and transverse rows with at least one of the valves in each succeeding selection pipe circuit having a progressively advanced transverse position relative to one of the valves in preceding circuits, a plurality of fluid-pressure command pipes each corresponding to one of the said longitudinal rows of valves, a plurality of command valves corresponding to each of the respective command pipes, all the valves of the selection pipe circuits forming groups which in number and disposition are related to the number of valves intercalated in each selection pipe circuit and to the number of command pipes, the selection pipes forming separate pipe circuits, a plurality of valves inserted in each pipe circuit and each pipe circuit being activated by putting into action a pre-selected combination of a plurality of command pipes, all the valves in the selection pipe circuits forming a multiplicity of combinations wherein the first selection pipe of the first group of valves combines the first with the second command pipe, the second selection pipe of the same group combines the first with the third command pipe, and so on successively until the last selection pipe of the first group of valves combines the first with the last command pipe of the selector, the second group of valves forming a multiplicity of combinations wherein the first selection pipe of this group combines the second with the third command pipe, the second selection pipe of this group combines the second with the fourth command pipe, the third selection pipe of this group combines the second with the fifth command pipe, and so on successively until the last selection pipe of the second group combines the second with the last command pipe of the selector; for the third group of valves, the first selection pipe of this group combines the third with the fourth command pipe, the second selection pipe of this group combines the third with the fifth command pipe, and so on successively until the last selection pipe of the third group combines the third with the last command pipe of the selector, the said combination system being applied successively for all the remaining groups of valves until the last group, which consists of only one selection pipe, combines the last plurality of command pipes of the selector.

References Cited in the file of this patent

UNITED STATES PATENTS

| 2,182,724 | Hennessy | Dec. 5, 1939 |
| 2,390,534 | Heuver | Dec. 11, 1945 |

FOREIGN PATENTS

| 533,667 | Great Britain | 1941 |